United States Patent
Minegishi et al.

(10) Patent No.: US 8,574,083 B2
(45) Date of Patent: Nov. 5, 2013

(54) POWER TRANSMISSION DEVICE AND JOINT UNIT OF POWER TRANSMISSION DEVICE

(75) Inventors: Kiyoji Minegishi, Obu (JP); Yuji Yano, Obu (JP); You Tsurumi, Obu (JP); Shun Abe, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 84 days.

(21) Appl. No.: 13/096,024

(22) Filed: Apr. 28, 2011

(65) Prior Publication Data

US 2011/0269554 A1 Nov. 3, 2011

(30) Foreign Application Priority Data

Apr. 30, 2010 (JP) ................. 2010-105680
May 18, 2010 (JP) ................. 2010-114781
Aug. 2, 2010 (JP) ................. 2010-173973
Mar. 8, 2011 (JP) ................. 2011-050640

(51) Int. Cl.
*F16D 7/02* (2006.01)

(52) U.S. Cl.
USPC ............. 464/30; 464/182; 403/282; 290/55

(58) Field of Classification Search
USPC ........ 464/30, 32, 182, 40; 415/265, 268, 282, 415/124.2; 403/124.2, 265, 268, 282; 290/44, 55
See application file for complete search history.

(56) References Cited

U.S. PATENT DOCUMENTS 5,031,272 A * 7/1991 Carmien ................. 403/268 X
5,346,022 A * 9/1994 Krivec
2007/0098549 A1 5/2007 Nies

FOREIGN PATENT DOCUMENTS

EP 2159438 * 3/2010
GB 2268569 * 1/1994 ................. 464/30

* cited by examiner

*Primary Examiner* — Gregory Binda
*Assistant Examiner* — Josh Skroupa
(74) *Attorney, Agent, or Firm* — Squire Sanders (US) LLP

(57) ABSTRACT

A power transmission device which transmits power between a first member and a second member, the first member has a hollow portion, the first member and the second member are fitted to each other by interference fitting by setting the external diameter of the second member so as to have a slightly larger size than the internal diameter of the hollow portion of the first member, and the surface of at least one of an inner periphery of the hollow portion of the first member and an outer periphery of the second member is subjected to a surface treatment in which slipping occurs when an excessive torque exceeding a predetermined value is applied, and the slipping stops and the original torque transmission to be performed in the power transmission device is performed again between the first member and the second member when the excessive torque is eliminated.

16 Claims, 8 Drawing Sheets

Fig. 7A
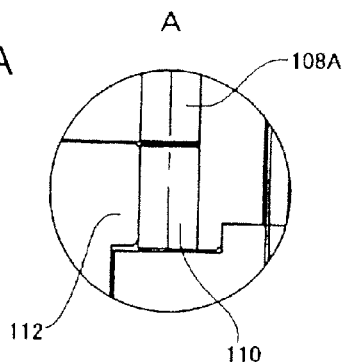
Fig. 7B
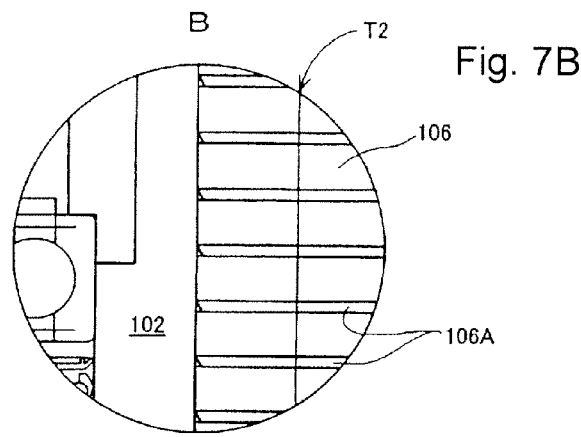
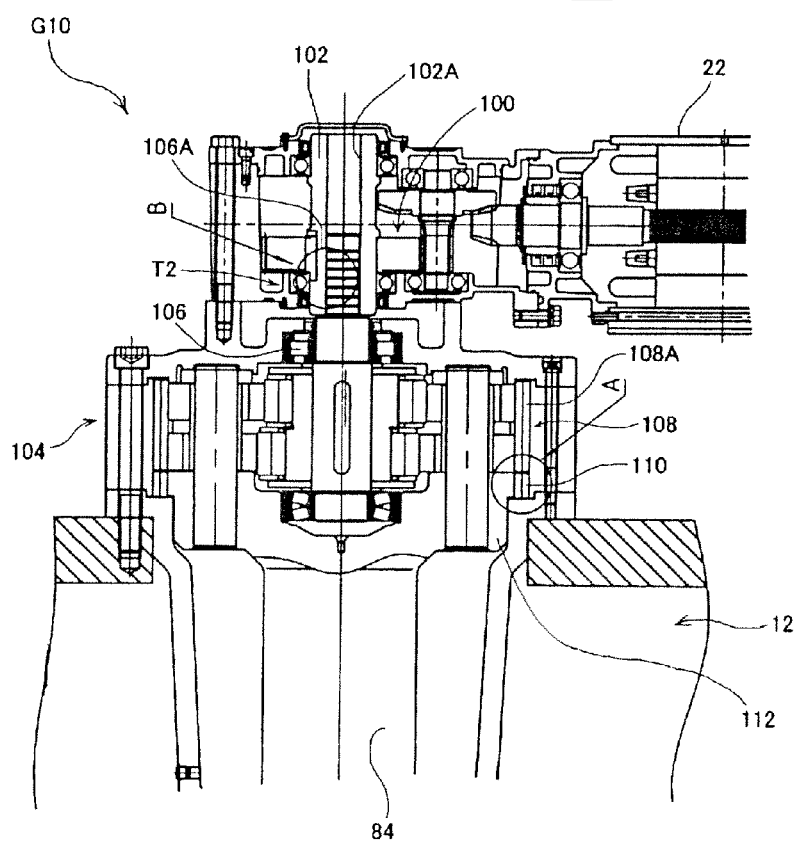
Fig. 7C

US 8,574,083 B2

POWER TRANSMISSION DEVICE AND JOINT UNIT OF POWER TRANSMISSION DEVICE

BACKGROUND

Technical Field

The present invention relates to a power transmission device and a joint unit of the power transmission device which are suitable for application to apparatuses to which an excessive load is sometimes input, in particular, like a power transmission device of a wind power generation facility.

Priorities are claimed on Japanese Patent Application No. 2010-105680, filed Apr. 30, 2010, Japanese Patent Application No. 2010-114781, filed May 18, 2010, Japanese Patent Application No. 2010-173973, filed Aug. 2, 2010, and Japanese Patent Application No. 2011-50640, filed Mar. 8, 2011, the entire contents of each of which are incorporated herein by reference.

A reduction gear used for yaw control of a nacelle (generator room) of a wind power generation facility or pitch control of windmill blades is disclosed in the related art.

Since the wind power generation facility is installed in a natural environment, the facility may receive disturbed wind or strong gusts sometimes.

The related art discloses the technique of actuating a slipping coupling and cutting off power transmission of a drive system to prevent overload of this drive system, when an excessive torque exceeding a setting value has been input from the windmill blades side. This slipping coupling is not assumed to be repeatedly used as it is after slipping, includes a sensor which detects occurrence of slipping, and is contrived so as to show that maintenance of the slipping coupling should be performed at the time of the next maintenance stop.

SUMMARY

According to an embodiment of the present invention, there is provided a power transmission device which transmits power between a first member and a second member. Here, the first member has a hollow portion. The first member and the second member are fitted to each other by interference fitting by setting the external diameter of the second member so as to have a slightly larger size than the internal diameter of the hollow portion of the first member. The surface of at least one of an inner periphery of the hollow portion of the first member and an outer periphery of the second member is subjected to a surface treatment in which slipping occurs when an excessive torque exceeding a predetermined value is applied, and the slipping stops and the original torque transmission to be performed in the power transmission device is performed again between the first member and the second member when the excessive torque is eliminated.

BRIEF DESCRIPTION OF THE DRAWINGS

FIGS. 7A-C are overall sectional views of a reduction gear of a wind power generation facility in which a power transmission device related to an example of another embodiment of the present invention is adopted.

DETAILED DESCRIPTION

Figure 1:
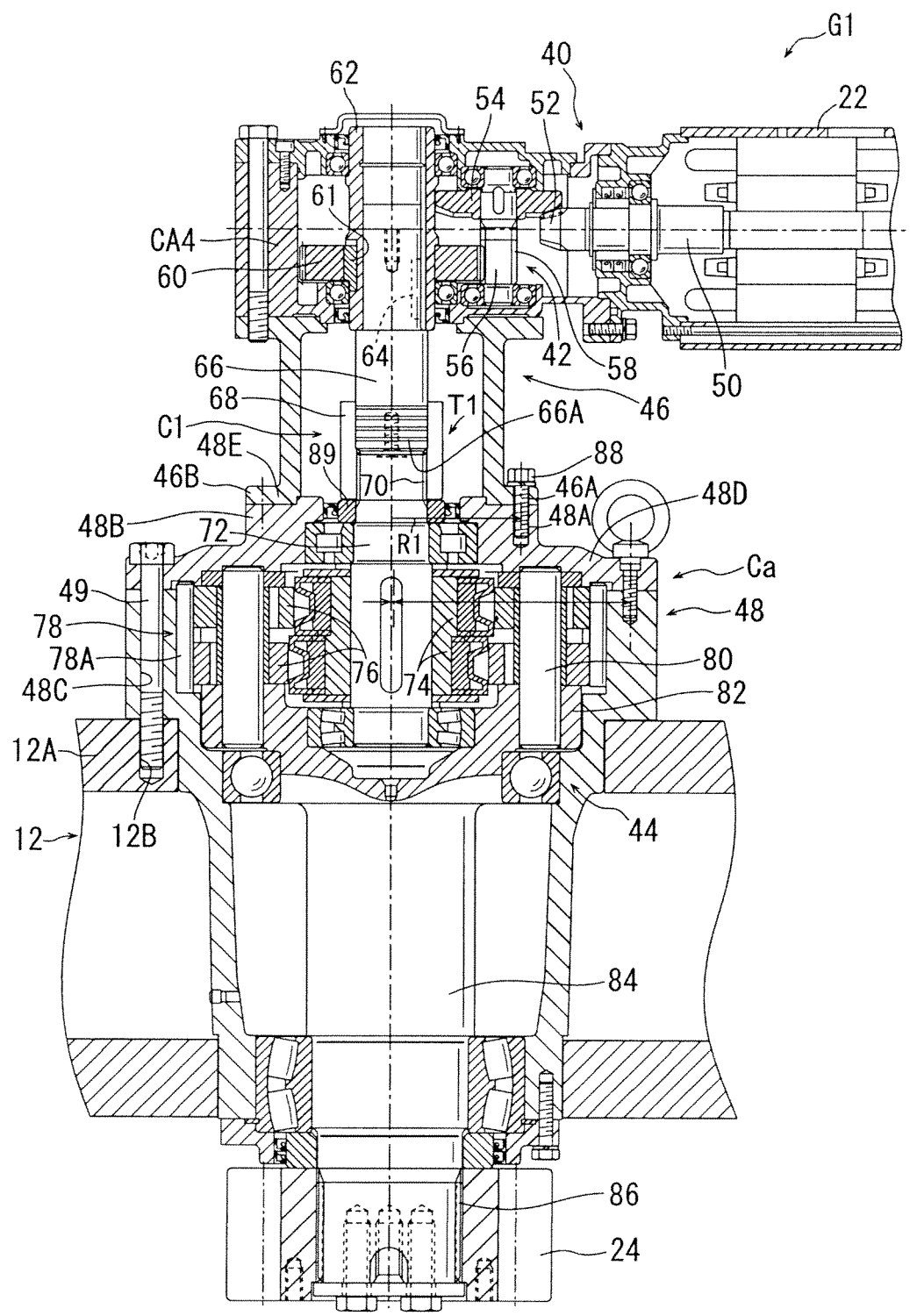
FIG. 1 is an overall sectional view of a reduction gear of a wind power generation facility in which a power transmission device related to an example of an embodiment of the present invention is adopted.

The maintenance of the wind power generation facility cannot be performed so frequently. Accordingly, a system which needs maintenance when slipping occurs once is extremely inconvenient. As a result, the threshold value of slipping start has to be set to an extremely high level such that actuation is made for the first time when a huge typhoon or the like has come. Conversely, this means that a basic drive system has to have the durability such that running lasts without being damaged until such an excessive load is applied, and the device is obliged to be enlarged.

There is a need for reducing a burden of maintenance and protecting an overall device effectively, without increasing the size of the device unduly, in a power transmission device which is suitably applied particularly in a situation with a possibility that a temporarily big load may be applied.

As in the above slipping coupling, in the case of a safety device of the structure in which slipping starts when an excessive torque of a predetermined value or more is applied to a power transmission system, the expression "slipping" is an emergency evacuation operation for protecting an apparatus. In a case where slipping has occurred once, it was believed that original torque transmission cannot be achieved from then on. In practice, it is not assumed even in the related art that the slipping coupling is repeatedly used as it is without maintenance even after slipping.

However, according to a number of test results carried out by the inventor, when interference fitting is performed after the surface of at least one of the inner periphery of the hollow portion of the first member, and the outer periphery of the second member is subjected to specific surface treatment, the inventor obtained the knowledge that the following two actions can be repeatedly obtained: a) slipping occurs when an excessive torque exceeding a predetermined value is applied; and b) the slipping stops and the original torque transmission to be performed in the power transmission device is again performed between the first member and the second member when the excessive torque is eliminated. This is based on the knowledge that it is confirmed that, even in the case of a test which actually adds an excessive torque intentionally and generates compulsory slipping intentionally is repeated two or more times, the surface treatment which can secure original transmission torque capacity again exists in practice (will be described below in detail).

According to an embodiment of the present invention, even if an overall device is unduly enlarged, it is possible to release some of temporarily input energy without transmission, thereby preventing an excessive torque from being applied to individual elements within the device, and it is possible to return automatically.

According to an embodiment of the present invention, an overall device can be effectively protected while reducing the load of maintenance without increasing the size of the device unduly.

Hereinafter, a power transmission device related to an example of an embodiment of the present invention will be described in detail.

The outline of a wind power generation facility in which the power transmission device is applied will first be described.

Figure 2:
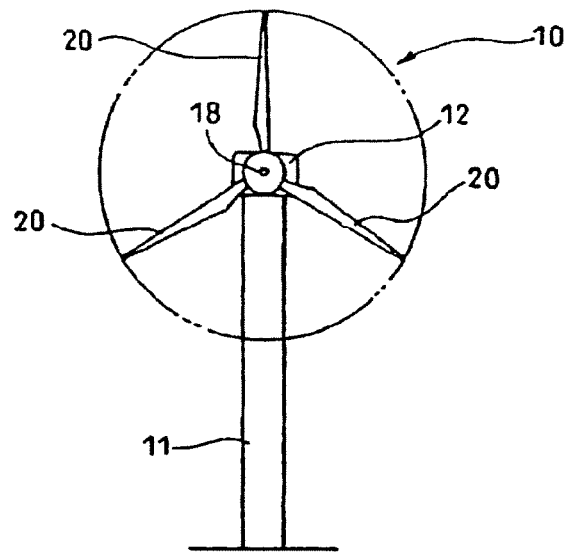
FIG. 2 is a front view of the wind power generation facility to which the reduction gear is applied.
Figure 3:
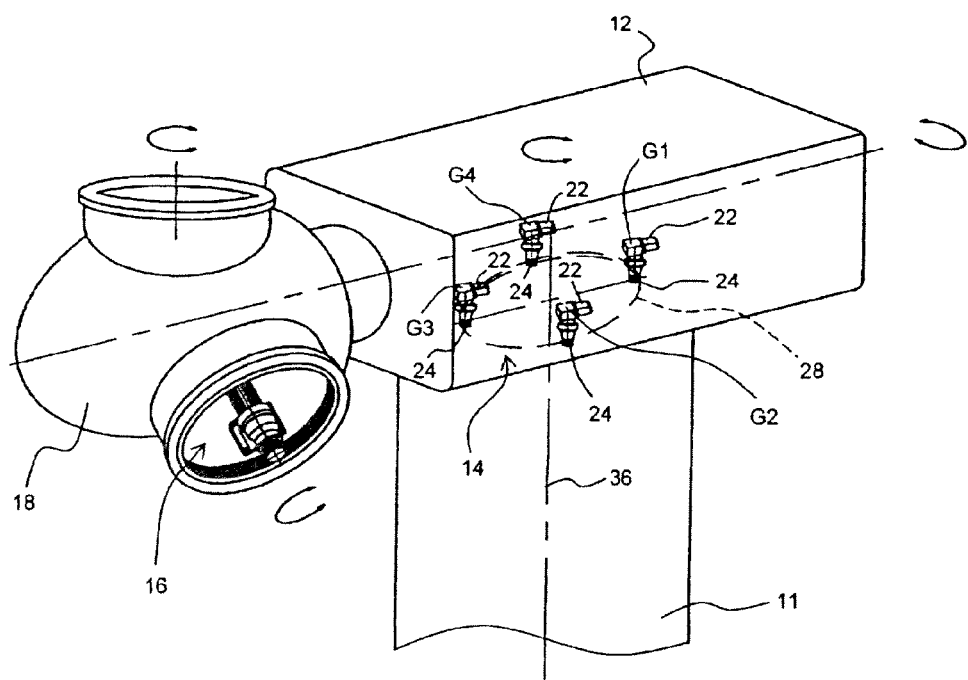
FIG. 3 is a perspective view showing an aspect in which the reduction gear is incorporated into a nacelle of the wind power generation facility.

Referring to FIGS. 2 and 3, the wind power generation facility 10 includes a nacelle (generator room) 12 at the uppermost part of a cylindrical supporting post 11. A yaw driving unit 14 and a pitch driving unit 16 are incorporated into the nacelle 12. The yaw driving unit 14 is provided to control the turning angle of the overall nacelle 12 with respect to the cylindrical supporting post 11, and the pitch driving unit 16 is provided to control the pitch angle of three windmill blades 20 attached to a nose cone 18.

In this embodiment, since the present invention is applied to the yaw driving unit 14, the yaw driving unit 14 will be described here.

Figure 4:
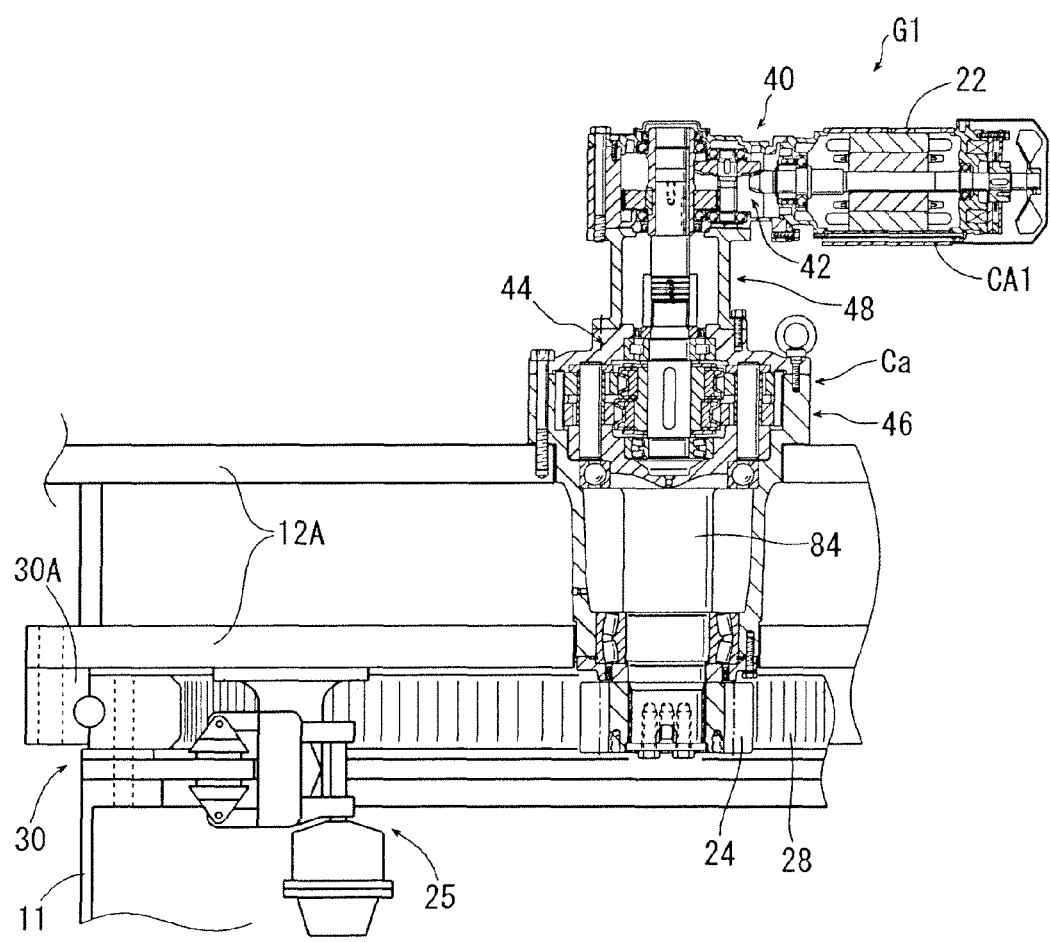
FIG. 4 is a sectional view of chief parts showing the structure of a yaw driving unit of the wind power generation facility.

The yaw driving unit 14 includes four reduction gears G1 to G4 with a motor 22 and an output pinion 24, and one internal gear 28 for turning which meshes with the respective output pinions 24. The individual reduction gears G1 to G4 are respectively fixed to predetermined positions on the side of a main body of the nacelle 12. Referring together to FIG. 4, the internal gear 28 for turning which meshes with the individual output pinions 24 of the individual reduction gears G1 to G4 is fixed to the cylindrical supporting post 11 side, thereby constituting an inner ring of a yaw bearing 30. An outer ring 30A of the yaw bearing 30 is fixed to a main body 12A side of the nacelle 12. In addition, a symbol 25 of FIG. 4 designates a brake mechanism of the yaw driving unit 14.

Through this configuration, when the individual output pinions 24 are simultaneously rotated by the motors 22 of the individual reduction gears G1 to G4, the output pinions 24 revolve around a center 36 (refer to FIG. 3) of the internal gear 28 while meshing with the internal gear 28. As a result, the overall nacelle 12 can be turned around the center 36 of the internal gear 28 fixed to the cylindrical supporting post 11. Thereby, the nose cone 18 can be directed to a desired direction (for example, a windward direction), and wind pressure can be efficiently received.

Since the reduction gears G1 to G4 have the same configuration, respectively, the reduction gear G1 will be described here.

Referring to FIG. 1, as for the reduction gear G1, the motor 22, an orthogonal gear mechanism 40, a parallel axis reduction mechanism 42, and a final stage reduction mechanism 44 are arranged in this order within a casing Ca on a power transmission path. In addition, the casing Ca can be divided into a high-speed-side casing body 46 and a low-speed-side casing body 48.

Hereinafter, description will be made in order on the power transmission path. A motor shaft 50 of the motor 22 also serves as an input shaft of the orthogonal gear mechanism 40. The orthogonal gear mechanism 40 includes a hypoid pinion 52 directly formed at the tip of the motor shaft 50, and a hypoid gear 54 which meshes with the hypoid pinion 52, and changes the rotational direction of the motor shaft 50 to a perpendicular direction. The hypoid gear 54 is fixed to an intermediate shaft 56. A spur pinion 58 of the parallel axis reduction mechanism 42 is directly formed in the intermediate shaft 56. The parallel axis reduction mechanism 42 includes the spur pinion 58, and a spur gear 60 which meshes with the spur pinion 58. The spur gear 60 is fixed to a hollow shaft 62 via a key 61. The hollow shaft 62 is coupled to a joint shaft 66 via a key 64.

The joint shaft 66 is press-fitted into a bush 68. In this embodiment, the power transmission device T1 related to the present invention is applied to a joint part of the joint shaft 66 and the bush 68. The configuration of the joint shaft 66 and the bush 68 will be described below in detail.

The final stage reduction mechanism 44 includes an input shaft 72 (of the final stage reduction mechanism 44) which rotates integrally with the bush 68, two eccentric bodies 74 provided at the input shaft 72, two external gears 76 which eccentrically oscillate via the eccentric bodies 74, and an internal gear 78 which internally meshes with the external gears 76. The two external gears 76 shift by exactly 180 degrees from each other in an eccentric phase, and rotate in an oscillating manner while maintaining a state where the external gears are eccentric from each other in mutually separating directions. The internal gear 78 is integrated with the low-speed-side casing body 48. The internal teeth of the internal gear 78 are constituted by cylindrical outer pins 78A, respectively. The number (the number of the outer pins 78A) of the internal teeth of the internal gear 78 is one more than the number of the external teeth of the external gears 76. Inner pins 80 are loosely fitted to the external gears 76. The inner pins 80 are integrated with an output flange 82, and the output flange 82 is integrated with an output shaft 84 of the reduction gear G1. In this embodiment, the internal gear 78 is integrated with the low-speed-side casing body 48. Therefore, when the input shaft 72 of the final stage reduction mechanism 44 rotates, the external gears 76 oscillate via the eccentric bodies 74, and the rotation (rotation on its own axis) of the external gears 76 relative to the internal gear is taken out from the output shaft 84 via the inner pins 80 and the output flange 82. The above-mentioned output pinion 24 is fixed and coupled to the output shaft 84 via a spline 86, and this output pinion 24 meshes with the internal gear 28 (FIGS. 3 and 4) for turning which has already been described.

Figure 5:
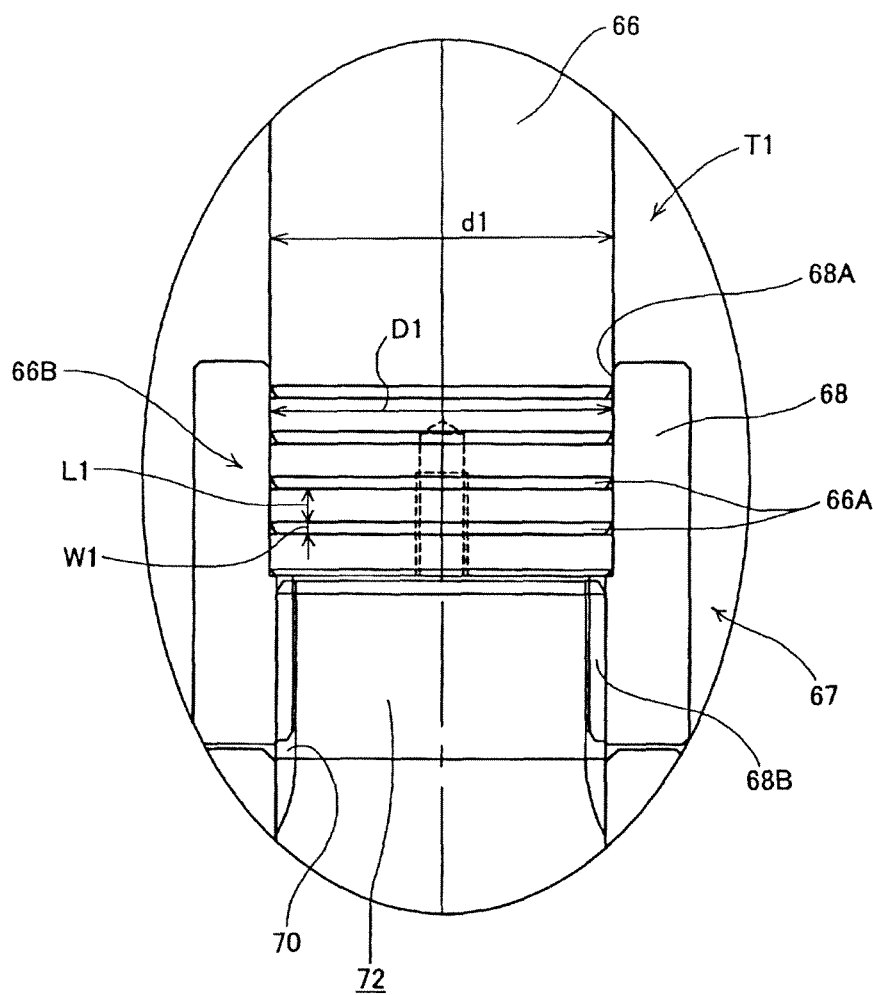
FIG. 5 is a sectional view of chief parts of a power transmission device related to an example of the embodiment of the present invention applied to the reduction gear of FIG. 1.

Here, referring together to FIG. 5, the configuration of the power transmission device T1 including the joint shaft 66 and the bush 68 will be described in detail.

The bush 68 includes a hollow portion 68A, and is equivalent to a first member in the present invention. The joint shaft 66 has a tip portion 66B fitted to a hollow portion 68A, and is equivalent to a second member of the present invention. The external diameter d1 of the tip portion 66B of the joint shaft 66 is set to have a slightly larger size than the internal diameter D1 of the hollow portion 68A (specifically, the portion of the hollow portions 68A into which the tip portion 66B of the joint shaft 66 is fitted) of the bush 68. That is, the joint shaft 66 and the bush 68 have a dimensional relationship of being interference-fitted, and are fitted to each other by press-fitting in this embodiment.

The tip portion 66B of the joint shaft 66 is formed with a plurality of (four in this embodiment) ring-shaped grooves 66A. An adhesive 66E is applied to the outer periphery of the tip portion 66B of the joint shaft 66, including the insides of the grooves 66A. More specifically, the adhesive 66E is uniformly applied to the outer periphery of the tip portion 66B of the joint shaft 66, and the adhesive 66E which slides down when the bush 68 is press-fitted is filled into the grooves 66A in a the state where there is no gap. As the adhesive 66E, a commercially available adhesive (for example, Trade names: Lock Tight 242, 243, etc. made by Henkel Japan, Inc.) used to prevent loosening of a screw of a vibrating device are used in this embodiment.

Through this configuration, as the joint shaft 66 and the bush 68 are fitted to each other by press-fitting (interference fitting), it is possible to realize a configuration in which, when an excessive torque exceeding a predetermined value is applied, the joint shaft and the bush slip on each other, and when the excessive torque is eliminated, return is made to a state where the torque up to a predetermined value can be transmitted again between the joint shaft 66 and the bush 68. In addition, in the present invention, the expression "slipping stops when the excessive torque is eliminated" does not necessarily mean "slipping stops immediately" when input torque becomes equal to or less than a predetermined value, and includes the concept "slipping stops when input torque becomes lower than a predetermined value to some extent".

In a test carried by the inventor, through the above configuration, it was confirmed in practice that return can be made to a state where the torque almost equal to the initial torque which can be transmitted whenever the excessive torque is eliminated can be transmitted, even after an excessive torque is applied, and slipping has occurred, for example, 100 times or more. Additionally, it was also confirmed that the predetermined value which is a threshold value at which slipping starts, and the degree of the return after slipping has occurred once are varied by changing the degree of the interference fitting, the number, axial width W1, axial interval L1, and depth (not shown) of the grooves 66A, the surface roughness of portions other than the grooves, the adhesion strength and hardness (or elastic modulus) of the adhesive, or the like. Through these kinds of adjustment, the surface treatment in which return can be made to a state where the torque up to a predetermined value can be transmitted is at least possible.

According to a further test carried by the inventor, it was also confirmed that, in a case where an excessive torque exceeding a predetermined value is applied and slipping has occurred when proper surface treatment is performed, transmission of the torque equivalent to the predetermined value is maintained while the slipping is continuing, and the return after the slipping has stopped can be completely performed. These characteristics mean that, for example, in a case where the present invention is applied to a power transmission device of a windpower generation facility, movement of the nacelle can be braked to some extent although the excessive torque caused by wind is released, automatic return can be made when slipping stops, whereby the characteristics become very preferable depending on the intended use.

It is contemplated that a mechanism of return to a state where occurrence of the slipping→maintenance of transmission of the torque equivalent to a predetermined value, and stop of the slipping→normal (less than the predetermined value) torque transmission can be performed is a result of the fact that pressure can be applied to three elements including the bush 68, the joint shaft 66, and the adhesive by proper "surface treatment" such that a limit of stress capable of transmitting torque occurs within an elastic deformable range. In short, the mechanism can be inferred to be that i) while the "stress" which only receives input torque is generated at joint parts of the three elements, "transmission" of this torque is possible, ii) when input torque becomes large beyond the stress which can be generated at the joint parts, the torque beyond the input torque cannot be transmitted, and "slipping" occurs, but torque transmission can be maintained to the same extent as the stress equivalent to elastic deformation even if slipping occurs, iii) when the deformation actually caused at a joint part between the first member and the second member is within an elastic deformable range at the joint part (at such a level that the joint part is not yet plastically deformed), return can be made to an initial torque transmission state when an excessive torque is eliminated. In any case, it is true that the surface treatment can be realized such that, when an excessive torque is applied, slipping occurs and transmission of the torque of a predetermined value is maintained, and when the excessive torque is eliminated, slipping stops, and return to an initial torque transmission state can be made.

In this meaning, the "surface treatment performed to the surface of at least one of the inner periphery of the hollow portion of the first member and the outer periphery of the second member" in the present invention is a concept including the surface treatment in the broad sense which has an influence on the coupled state or elastically deformed state of the first member and the second member, such as the treatment of applying an adhesive, in addition to the surface treatment in the narrow sense which forms mechanical irregularities of grooves or the like in the first member and the second member themselves.

In other words, the surface treatment of the present invention can also be treated as the "surface treatment in which the first member and the second member are fitted to each other by interference fitting within an elastically deformable range". That is, since the related-art interference fitting, such as press-fitting, does not contain the idea of "is repeatedly slipped", in order to realize firm integration by the easiest possible work, one member (normally, the first member having the hollow portion) is made softer than the other member, thereby performing fitting accompanied by "plastic deformation". Accordingly, once slipping starts, the transmission torque decreases abruptly (transmission of the torque equivalent to a torque value when slipping starts cannot be maintained). When slipping occurs once, return to an initial firm integration state cannot be made even if an excessive torque is removed and slipping stops.

Whether or not the fitting by interference fitting within an elastically deformable range is performed can be determined depending on whether each returns to its original state, for example, when the "fitting" and "pulling apart" of the first member and the second member are repeated. When the "fitting within an elastically deformable range" is made, even if fitting and pulling-apart are repeated, both the inner periphery of the first member and the outer periphery of the second member return to their internal diameter and external diameter before fitting, respectively, whenever they are pulled apart.

Figure 6:
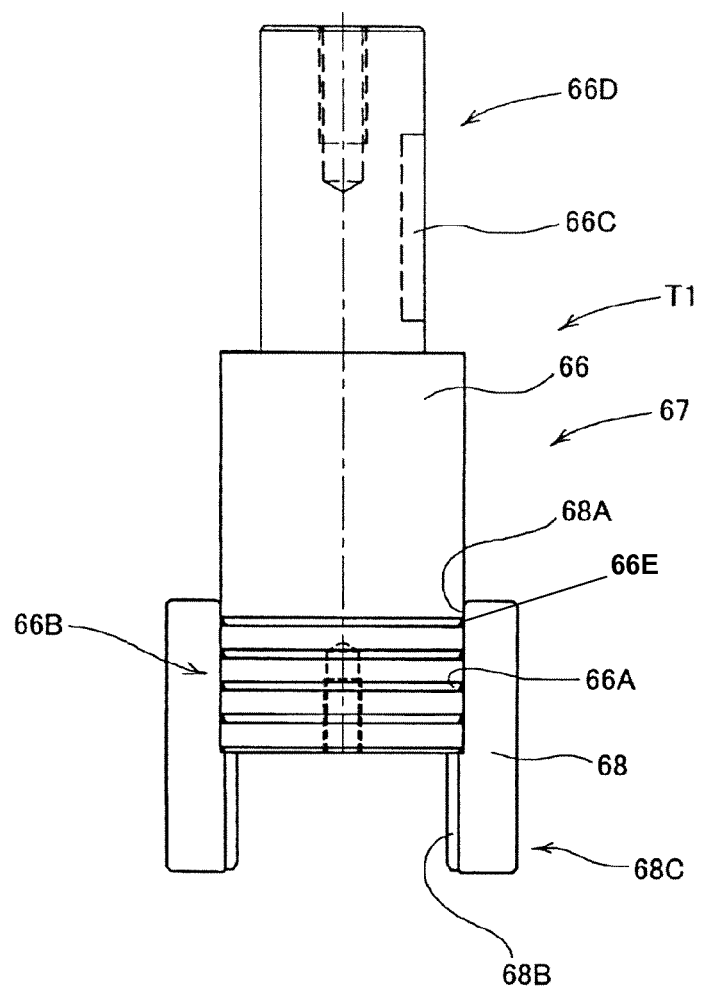
FIG. 6 is an overall sectional view of a joint unit related to an example of the embodiment of the present invention.

As shown in FIG. 6, the joint shaft 66 related to this embodiment has a coupling portion 66D with the hollow shaft 62. The coupling portion 66D is formed with a key groove 66C in which the aforementioned key 64 for coupling the joint shaft 66 and the hollow shaft 62 together is received. Additionally, the bush 68 has a coupling portion 68C to which an input shaft 72 of the final stage reduction mechanism 44 fits, on the side opposite to the hollow shaft. The coupling portion 68C is formed with a spline 68B for coupling the bush 68 and the input shaft 72 (spline 70) together. That is, the joint shaft 66 and the bush 68 constitute a pair (one set) of "joint units 67". The working effects obtained by constituting the joint units 67 will be described below.

In addition, referring back to FIG. 1, in this embodiment, the joint shaft 66 and the bush 68 are received in an independent joint casing 46A. The joint casing 46A is formed with a window 46A1, and the joint shaft 66 and the bush 68 can be observed from the outside of the joint casing 46A. A "mark" is put on the joint shaft 66 and the bush 68 so as to straddle both the joint shaft 66 and the bush 68, and whether or not the position of the mark has shifted is observed from the window 46A1 such that it can be confirmed that the joint shaft 66 and the bush 68 slip on each other as a precaution.

Next, the operation of the reduction gear G1 including the power transmission device T1 related to this embodiment will be described.

The rotation of the motor shaft 50 of the motor 22 is speed-reduced at an initial stage by the meshing between the hypoid pinion 52 and the hypoid gear 54 of the orthogonal gear mechanism 40, and simultaneously, the direction of the rotating shaft is changed by 90 degrees, whereby the rotation is transmitted to the intermediate shaft 56 of the parallel axis reduction mechanism 42.

The rotation of the intermediate shaft 56 is speed-reduced by the meshing between the spur pinion 58 and the spur gear 60, and is transmitted to the hollow shaft 62 by the key 61. The rotation of the hollow shaft 62 is transmitted to the joint shaft 66 via the key 64 fitted into the key groove 66C of the joint shaft 66. The rotation of the joint shaft 66 is transmitted to the bush 68 by the adhesive filled into the grooves 66A and the fitting caused by press-fitting, and is transmitted to the input shaft 72 of the final stage reduction mechanism 44 via the spline 68B on the inner peripheral side of the bush 68 and the spline 70 of the outer periphery of the input shaft.

When the input shaft 72 of the final stage reduction mechanism 44 rotates, the external gears 76 rotate in an oscillating manner via the eccentric bodies 74 (while internally meshing with the internal gear 78). Therefore, a phenomenon in which the meshing positions with the internal gear 78 shift sequentially occurs. As a result, whenever the input shaft 72 of the final stage reduction mechanism 44 rotates once, one external gear oscillates, and the phase thereof shifts one tooth by one tooth with respect to the internal gear (in a fixed state) 78 (a rotational component on its own axis is generated). Speed reduction in the final stage reduction mechanism 44 is realized by taking out this component on its own axis to the output shaft 84 side via the inner pins 80 and the output flange 82. The rotation of the output shaft 84 is transmitted to the output pinion 24 via the spline 86. Since the output pinion 24 meshes with the internal gear 28 for turning, and the internal gear 28 is fixed to the cylindrical supporting post 11 side, eventually, the nacelle 12 is rotated in the horizontal direction with respect to the cylindrical supporting post 11 by a reaction.

Here, as a gust or the like acts on the windmill blades 20, a huge torque to turn the nacelle 12 is input from the output pinion 24 side of the reduction gear G1 for yaw driving. This huge "external load" drives the final stage reduction mechanism 44 of this reduction gear G1 from backward, and rotates the bush 68 via the splines 70 and 68B. If this rotational torque is within an assumed torque (equal to or less than a predetermined value), no slipping occurs between the bush 68 and the joint shaft 66, the torque is further transmitted to the parallel axis gear mechanism 42 side of the reduction gear G1 as it is, and is finally received by a braking device (not shown) attached to the motor 22. As a result, the movement of the nacelle 12 by wind is reliably braked. Additionally, in this case, no abnormalities occur in respective parts of the reduction gear G1.

However, when the torque exceeding a predetermined value is input from the output pinion 24 side (bush 68 side), (since if no change is made there is a possibility that an abnormality may occur in the respective parts of the reduction gear G1), slipping occurs between the bush 68, and the joint shaft 66. Therefore, some of the excessive torque from the output pinion 24 side can be released here. Accordingly, although the nacelle 12 rotates horizontally somewhat according to the wind, damage to a motor, a gear mechanism, or the like can be prevented (at this time, a suitable braking force can be given to the nacelle 12 by braking the torque equivalent to a predetermined value transmitted even to the motor 22 side). Additionally, when a storm dies down, since the bush 68 and the joint shaft 66 return automatically to their original torque transmission states, wind power generation can be continued as it is.

According to the power transmission device T1 related to the present embodiment, since it is unnecessary to provide a sensor or an electric control system in order to cope with an excessive torque, a highly-reliable operation is possible even in a bad weather state in which the control system tends to be damaged by lightning, flooding, or the like.

In addition, since it can be confirmed whether or not the joint shaft 66 and the bush 68 have slipped on each other from the window 46A1 formed in the joint casing 46A from the previous maintenance to the present maintenance, an operator's attention can be attracted during maintenance.

Here, in this embodiment, the power transmission device T1 related to the present invention is embodied in the form of the "joint units 67". For this reason, it is possible to perform confirmation and adjustment such that torque transmission characteristics and torque return characteristics as set are obtained in the manufacture stage within a factory, and even if malfunction has occurred, the merit that only replacement as "one part" is needed on the spot (inside the narrow nacelle) is obtained.

Additionally, it is also possible to "select" the joint units 67 which actually have the torque characteristics which are most appropriate for the reduction gear G1 from a plurality of joint units, on the basis of the torque characteristics obtained in an actual slipping test within a factory.

Moreover, in a case where the joint units (67) are sold in large quantities as single bodies (not limited to the application for wind power generation), it is possible to classify the individual joint units (67) on the basis of actually measured torque characteristics, thereby differentiating products on the basis of the actual torque characteristic.

In any case, such adjustment or selection can be executed within a factory. Thereby, it is possible to obtain the "joint units 67" in which handling is easy, and the reproducibility and reliability of the torque characteristics are extremely high.

Here, the power transmission device T1 related to the present invention does not necessarily need to be based on the form of such a "joint unit". For example, the joint units can also be directly incorporated into shafts, such as the input shaft, intermediate shaft, and output shaft of the reduction gear, thereby further reducing space. The example is shown in FIGS. 7A-C.

In a power transmission device T2 related to this embodiment, a hollow shaft 102 of a parallel axis gear mechanism 100 of a reduction gear G10 is made to function as a first member (having a hollow portion 102A) of the power transmission device T2 related to the present invention, and an input shaft 106 of a final stage reduction mechanism 104 is made to function directly as a second member as shown in FIG. 7C. As shown in an enlarged manner within a circle B of FIG. 7B, the input shaft 106 is formed with a plurality of (seven in this example) of the same grooves 106A as those of the joint shaft 66 in the previous embodiment, and an adhesive is filled into the grooves 106A. The basic configuration regarding the grooves 106A, the adhesive, and the press-fitting is the same as that of the previous embodiment.

In addition, in this embodiment, as shown in an enlarged manner within a circle A of FIG. 7A, rollers 110 with the same diameter as outer pins 108A which constitute the internal teeth of the internal gear 108 extend coaxially with the outer pins 108A, and the rollers 110 function as a bearing of the output flange 112. Since the other configurations are same as those of the previous embodiment, the same reference numerals are given to the same or similar portions in FIGS. 7A-C, and duplicate description is omitted.

According to the structure related to this embodiment, the space occupied as the "joint units" in the previous embodiment is eliminated, and the size of the overall device can be made more compact, and the number of parts can also be reduced.

Figure 8A:
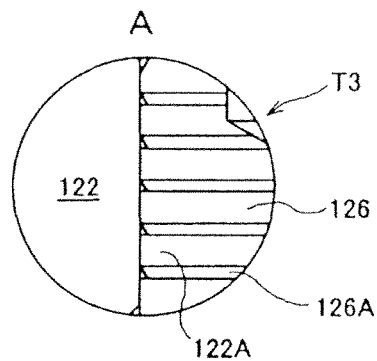
FIGS. 8A-B are overall sectional views of a reduction gear of a wind power generation facility in which a power transmission device related to an example of still another embodiment of the present invention is adopted.

In addition, an apparatus into which the power transmission device related to the present invention is incorporated is not limited to the reduction gear as described above. An example of still another embodiment of the present invention is shown in FIGS. 8A-B.

Figure 8B:
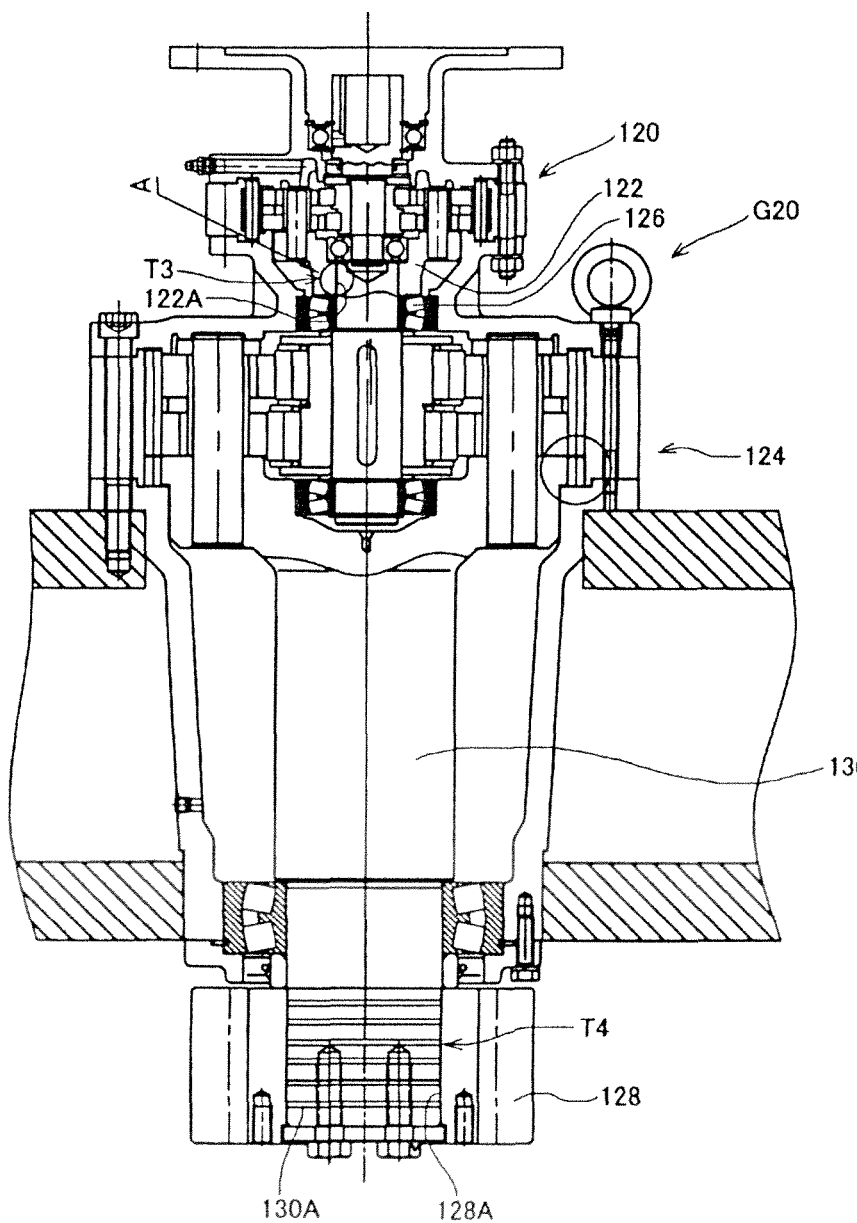

In this embodiment, power transmission devices T3 and T4 related to the present invention are incorporated into a reduction gear G20 constituted by a planetary gear mechanism of a two-stage oscillating internal meshing type as shown in FIG. 8B. The basic configuration of preceding-stage and subsequent-stage planetary gear mechanisms 120 and 124 is the same as that of the final stage reduction mechanism 44 in the previous embodiment.

In this embodiment, the output flange 122 of the preceding-stage planetary gear mechanism 120 is made to function as a first member (having a hollow portion 122A) of the power transmission device T3 related to the present invention, and an input shaft 126 of the subsequent-stage planetary gear mechanism 124 is made to function as a second member. As shown in an enlarged manner in the circle A of FIG. 8A, the input shaft 126 of the subsequent-stage planetary gear mechanism 124 is formed with a plurality of grooves 126A, and an adhesive is applied to the outer periphery of the input shaft 126, including the insides of the grooves 126A, and then the input shaft 126 and the output flange 122 are fitted to each other by interference fitting, such as press-fitting.

Additionally, in this embodiment as shown in FIG. 8B, the output pinion 128 of the subsequent-stage planetary gear mechanism 124 is made to function as a first member (having hollow portion 128A) of the power transmission device T4 related to the present invention, and the output shaft 130 of the subsequent-stage planetary gear mechanism 124 is made to function as a second member. The output shaft 130 of the subsequent-stage planetary gear mechanism 124 is also formed with a plurality of grooves 130A, and an adhesive is applied to the outer periphery of the output shaft 130, including the insides of the grooves 130A, and then, the output shat 130 and the output pinion 128 are press-fitted to each other by interference fitting.

Even in such a reduction gear, it is possible to perform surface treatment capable of returning torque after the slipping intended in the present invention through such a configuration, and the original effects of invention can be obtained correspondingly.

Additionally, in this embodiment, as compared to the earlier embodiment, the overall device can be made more compact to the same extent as the space occupied as the "joint units", and the number of parts can also be reduced.

Figure 9:
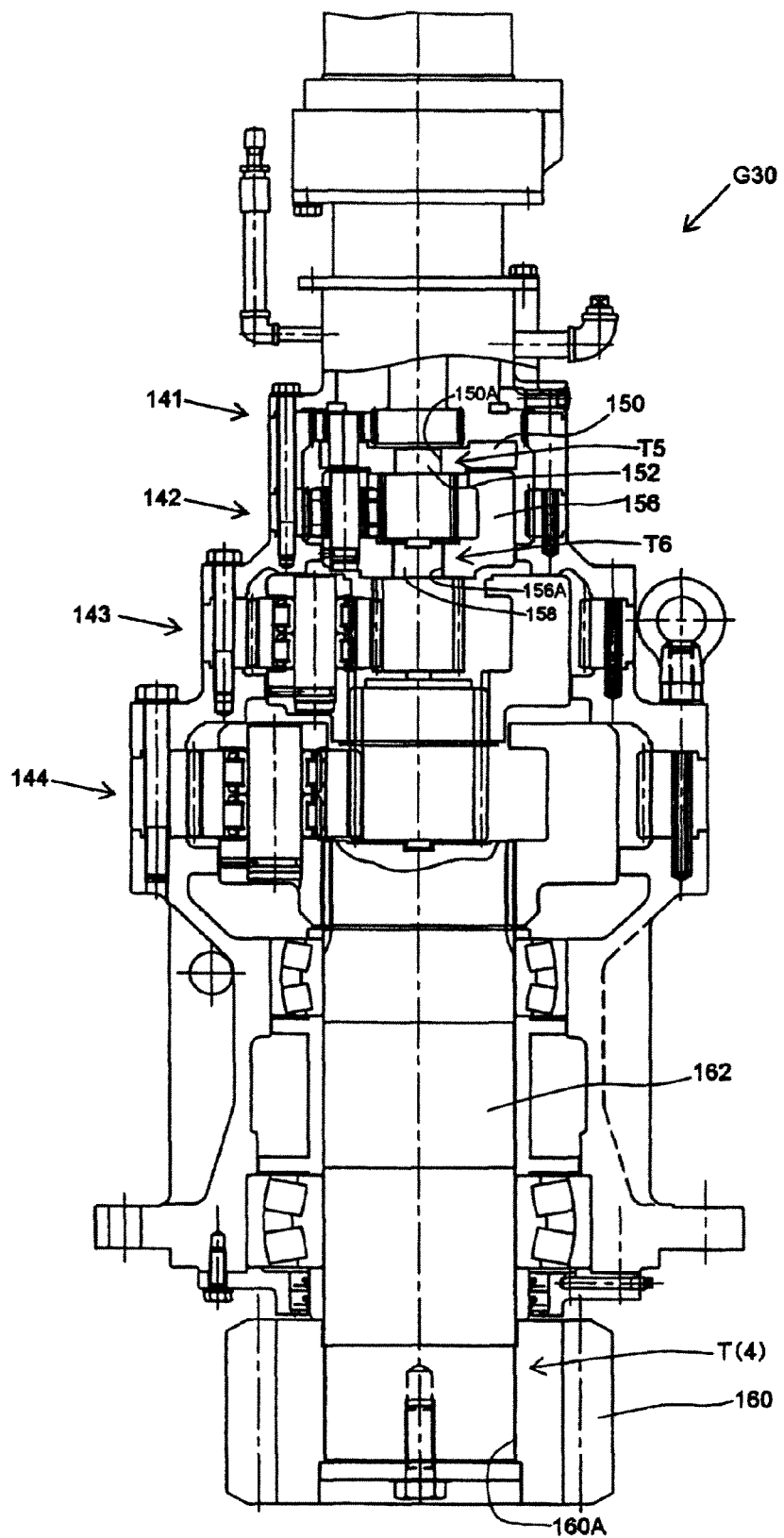
FIG. 9 is an overall sectional view of a reduction gear of a wind power generation facility in which a power transmission device related to an example of a further embodiment of the present invention is adopted.

An example of still another embodiment of the present invention is shown in FIG. 9.

In this embodiment, power transmission devices T5 and T6 related to the present invention are incorporated into a reduction gear G30 constituted by four-stage simple planetary gear mechanisms 141 to 144.

That is, in this embodiment, an output carrier 150 of a first-stage simple planetary gear mechanism 141 is made to function as a first member (having a hollow portion 150A) of the power transmission device T5 related to the present invention, and an input shaft 152 of a second-stage simple planetary gear mechanism 142 is made to function as a second member. The input shaft 152 of the second-stage simple planetary gear mechanism 142 is formed with a plurality of grooves (not shown), and an adhesive is applied to the outer periphery of the input shaft 152, including the insides of the grooves, and then, the input shaft 152 and the output carrier 150 are press-fitted by interference fitting.

Additionally, in this embodiment, an output carrier 156 of the second-stage simple planetary gear mechanism 142 is made to function as a first member (having a hollow portion 156A) of the power transmission device T6 related to the present invention, and an input shaft 158 of a third-stage simple planetary gear mechanism 143 is made to function as a second member. The input shaft 158 of the third-stage simple planetary gear mechanism 143 is formed with a plurality of grooves (not shown), and an adhesive is applied to the outer periphery of the input shaft 158, including the insides of the grooves, and then, the input shaft 158 and the output carrier 156 are press-fitted by interference fitting.

The invention can also be applied to the reduction gear G30 of such a configuration, and appropriate effects can be obtained. In addition, even in this embodiment, instead of the application position or in addition to the application position, similarly to the power transmission device T4 related to the previous embodiment, an output pinion 160 of a final-stage planetary gear mechanism 144 is made to function as a first member (having a hollow portion 160A) related to the present invention, and an output shaft 162 of the final-stage planetary gear mechanism 144 is made to function as a second member.

Even in this embodiment, since the effects peculiar to the present invention can be obtained, and direct incorporation into the power transmission path is made, an increase in the number of parts can be prevented, and compactness of the overall device can also be maintained.

As such, in the present invention, whether the present invention is applied to any part of any driving system is not particularly limited. Here, as in the earlier embodiments, it is more preferable that the present invention is not applied to a part which rotates at the same rotating speed (rotates at high speed) as a motor. This is because it is not preferable that high-speed sliding occurs when slipping has occurred.

As for the specification of the surface treatment, in short, specific treatment is not particularly limited to the examples in the above embodiments as long as the surface treatment is performed in which slipping occurs when an excessive torque exceeding a predetermined value is applied to the surface of at least one of the inner periphery of the hollow portion of the first member and the outer periphery of the second member, and the original torque until the predetermined value is transmitted again between the first member and the second member when the excessive torque is eliminated. The surface treatment which forms the grooves illustrated in the embodiment is suitable in that, in addition to manufacturing being easy, there is little mechanical damage when slipping has occurred, and a holding space can be formed when an adhesive or the like is used therewith. However, as treatments other than the treatment which forms the grooves, for example, there are shotpeening and knurling. Additionally, barrel polishing using a large polishing stone is also effective. These "treatments which form mechanical irregularities on the surface of a member" are particularly suitable even as an example which treats surfaces other than grooves together with formation of the grooves. Of course, such techniques may be adopted alone instead of the grooves. Additionally, such mechanical irregularities (including grooves) may be formed at the inner periphery of the hollow portion of the second member (not at the outer periphery of the first member). Particularly, as in the power transmission device T4 of FIG. 8, it is better to form the mechanical irregularities at the inner periphery in a place where the torque to treat is large. Naturally, the mechanical irregularities may be formed at both the first member and the second member. Such "treatments which form mechanical irregularities on the surface of a member" are effective from the viewpoint of securing a high predetermined value while maintaining a lower degree of difficulty of "fitting work".

On the other hand, like the application of an adhesive, a surface treatment which has an influence on the coupled state or elastically deformed state of the first member and the second member may function very effectively for the present invention. Other than the application of an adhesive, the application of a high-viscosity filler material, the interposition of a hard film or a sheet, and the like, fall within this. For example, using, as a filler material, oil from which a particularly high shearing stress can be expected among so-called oils for traction drive may be effective in, for example, applications in which slipping time becomes relatively long. In addition, although the surface treatments related to the present invention are preferably used together with mechanical irregularities of grooves or the like, the application of an adhesive or the like may be used alone.

Additionally, even if an adhesive is not used at all, the present invention can be realized by selection of materials, and contrivance of manufacture techniques. When the inventor actually carried out various tests in a power transmission device which can be used as the reduction gear for yaw driving of the wind power generation facility related to the aforementioned configuration, high reproduction results of at least several tens of times or more were obtained, for example, by adopting a member obtained performing grounding after quenching and tempering, using bearing steel (for example, SUJ2 of JIS G 4805) as a first member, by adopting a member obtained by performing barrel polishing after carburizing, quenching and tempering, using carburized steel (for example, SCN420 of JIS G 4053) as a second member, and performing press-fitting within an elastically deformable range. In addition, in this test example, specifically, the internal diameter of the first member and the external diameter of the second member was set such that both the first and second members can be press-fitted to each other within an elastically deformable range, and slip on each other with the torque (predetermined value) to slip as the reduction gear of the yaw driving unit of the wind power generation facility. In addition, in the case of the yaw driving unit of the embodiment, the "predetermined value" was 400 Nm to 600 Nm when the reduction ratio or the like of the final stage reduction mechanism 44 was taken into consideration, but was set as 500 Nm in the present test.

In this repeated test, it was confirmed that the following actions can be repeatedly realized in practice with extremely high reproducibility: A) even if excessive torques of various kinds of magnitude are given, transmission of about 500 Nm torque can be maintained and secured as the "torque equivalent to a predetermined value" while slipping occurs; and B) when addition of an excessive torque is stopped, the torque of a normal level which does not reach 500 Nm is not given, return to a state where power transmission can be performed without slipping.

In addition, in the above embodiment, fitting by simple and low-cost "press-fitting" is adopted in order to realize interference fitting. However, when stronger fitting (transmission of stronger torque) is required, fitting by shrink-fitting, cooling fitting, or the like is effective.

In short, as conditions for realizing the functions of Certain embodiments of the present invention effectively, materials and surface treatments may be selected such that the following two conditions can be made compatible with each other: (1) the first member and the second member can be fitted to each other by interference fitting within an elastically deformable range; and (2) the torque with which slipping starts within a range which is larger than a maximum torque to be transmitted during normal driving and is smaller than the torque with which the device may be damaged can be set as a "predetermined value". From this viewpoint, even if the surface treatment in the broad sense which is already described is not performed "separately", the functions of the present invention can be realized simply by selection of materials as long as the materials themselves have a proper surface state in which the above conditions (1) and (2) can be made compatible with each other. For example, the characteristics which can make the conditions (1) and (2) compatible with each other may be obtained simply manufacturing tungsten materials (hard metal, high-speed steel, and the like) containing tungsten, or materials containing titanium, though expensive, in a required shape, using typical manufacturing techniques. In addition, it is natural that contrivance of seizure preventing treatment which does not cause seizure for as long a period as possible even if slipping occurs repeatedly may be carried out in parallel.

Additionally, the example to which the present invention has been applied to the reduction gear for yaw driving has been shown in the above embodiment. However, the present invention can also be applied to, for example, a reduction gear of a pitch driving unit. Moreover, the present invention can be similarly applied to applications other than wind power generation, particularly, to applications with a high possibility of being temporarily brought into an overload state. That is, if appropriate from the viewpoint of the working effects of the present invention, the present invention can also be applied to applications in which an excessive torque tends to be generated when biting a foreign matter, for example, like conveyors for mines or conveyors for chips of working machines. Additionally, the present invention can also be applied to applications, such as turning of a deck crane, drill driving of a shield excavator, and turning of a shovel for construction. That is, this is because a situation, which is influenced by wind during work, which is influenced by the inertia force of a heavy object, or which receives a large reaction force suddenly from a work object due to collision against an obstacle, a subterranean rock, or the like, thereby receiving a temporary strong torque from load side, may be formed even in these applications. In the present invention, the present invention can also be applied to such an application, and the same working effects are obtained.

In addition, from the purport of the present invention, the expression "a surface treatment in which slipping occurs when an excessive torque exceeding a predetermined value is applied, and the slipping stops and the original torque transmission to be performed in the power transmission device is performed again between the first member and the second member as when the excessive torque is eliminated" should be interpreted as follows.

That is, with respect to the expression "slipping occurs when an excessive torque exceeding a predetermined value is applied", transmitting the torque equivalent to the predetermined value while slipping occurs is not necessarily needed, and it may be sufficient if only the torque which is smaller than the torque equivalent to the predetermined value and smaller than the torque transmitted at normal time is transmitted.

Additionally, as already described, the expression "slipping stops when the excessive torque is eliminated" does not necessarily mean "slipping stops immediately" when input torque becomes equal to or less than a predetermined value, and includes the concept "slipping stops when input torque becomes lower than a predetermined value to some extent".

Moreover, the expression "the original torque transmission to be performed in the power transmission device is performed again between the first member and the second member" does not necessarily require that 100% of torque return is secured, and means that return to a state where the torque required for driving a driving target of the power transmission device can be transmitted can be made. More specifically, for example, the "predetermined value at which slipping starts (slipping starting torque)" may be changed depending on repetition. That is, in the present invention, the "predetermined value" may be set to a range which is larger than the greatest transmission torque assumed at normal driving and smaller than the transmission torque with which the device may be damaged. Thus, the "predetermined value" itself may be changed depending on repetition of slipping as long as return to a state where slipping does not occur up to the "predetermined value" which belongs to this range (after the slipping is stopped)". For example, in the yaw driving unit of the wind power generation facility as illustrated as the embodiment, a setting value at which slipping occurs is sufficiently larger than the torque transmitted by the output of an ordinary motor. Thus, even if the torque after return drops somewhat from the initial torque, the nacelle can be driven and turned by the torque from the motor side without any difficulty. If the nacelle can be driven and turned without any difficulty in the yaw driving unit, it may be considered that return to the state of "the original torque transmission to be performed in the power transmission device is performed again" has been made.

Additionally, in relation to the wording "again", the number of times of return is also greatly influenced by the applications. In the case of an application in which, from the start, the frequency at which slipping occurs is not so high, for example, an application as in the yaw driving unit of the wind power generation facility as illustrated as the embodiment, as long as return can be made such that the original torque transmission which can drive turning of the nacelle between the first member and the second member again can be performed even if slipping occurs about several times, the function as yaw driving unit can be achieved without substantial difficulty, and running of the wind power generation facility can be continued. However, in applications in which an excessive torque is comparatively frequently generated like generation of an excessive torque at the time of biting of a foreign matter of a conveyor, it is believed that, for example, around several hundred returns are required or depending on the case, several thousand returns are required. In short, in relation to the application (frequency at which slipping occurs) of the power transmission device, as long as return can be made as many as the number of times at which normal running of the power transmission device can be continued without any big difficulty, it may be considered that it can be said that "the original torque transmission to be performed in the power transmission device is performed again between the first member and the second member" related to the present invention.

It should be understood that the present invention is not limited to the above-described embodiment, but may be modified into various forms on the basis of the spirit of the present invention. Additionally, the modifications are included in the scope of the present invention.

We claim:

1. A power transmission device which transmits power between a first member and a second member, comprising:
   a first shaft and a second shaft disposed on a power transmission path of the power transmission device,
   wherein the first member has a hollow portion, the hollow portion penetrating the first member axially,
   wherein one end part of the hollow portion of the first member and one end part of the second member are fitted to each other by interference fitting by setting the external diameter of the one end part of the second member so as to have a slightly larger size than the internal diameter of the one end part of the hollow portion of the first member,
   the other end part of the second member is connected to the first shaft,
   the second shaft is fitted to the other end part of the hollow portion of the first member so as the first member and the second shaft are connected to each other, and
   wherein the surface of at least one of an inner periphery of the hollow portion of the first member and an outer periphery of the second member is subjected to a surface treatment in which slipping occurs when an excessive torque exceeding a predetermined value is applied, and the slipping stops and the original torque transmission to be performed in the power transmission device is performed again between the first member and the second member when the excessive torque is eliminated,
   wherein the power transmission device comprises a first reduction mechanism and a second reduction mechanism, and
   wherein the first reduction mechanism comprises the first shaft, and the second reduction mechanism comprises the second shaft.

2. The power transmission device according to claim 1, wherein the surface treatment is a surface treatment in which both the first member and the second member are fitted to each other by the interference fitting within an elastically deformable range.

3. The power transmission device according to claim 1, wherein the surface treatment includes the treatment of forming mechanical irregularities in the surface of at least one of the inner periphery of the hollow portion of the first member and the outer periphery of the second member.

4. The power transmission device according to claim 3, wherein the treatment of forming mechanical irregularities includes the treatment of forming ring-shaped grooves in the surface of at least one of the inner periphery of the hollow portion of the first member and the outer periphery of the second member.

5. The power transmission device according to claim 1, wherein the surface treatment includes the treatment of applying an adhesive to the surface of at least one of the inner periphery of the hollow portion of the first member and the outer periphery of the second member.

6. The power transmission device according to claim 1, wherein the surface treatment includes the treatment of using, together with the treatment of forming mechanical irregularities in the surface of at least one of the inner periphery of the hollow portion of the first member and the outer periphery of the second member, the treatment of applying an adhesive to the surface.

7. The power transmission device according to claim 1, wherein the interference fitting is realized by press-fitting.

8. The power transmission device according to claim 1, wherein the first member and the second member are received within a casing, and the casing is formed with a window for confirming that the first member and the second member slip on each other.

9. A power transmission device of a wind power generation facility comprising the power transmission device according to claim 1 as a part of its own driving force transmission system.

10. A joint unit used in the power transmission device of claim 1, comprising a shaft member and a bush having a hollow portion penetrating the bush axially,
wherein one end part of the bush and one end part of the shaft member are fitted to each other by interference fitting by setting the external diameter of the one end part of the shaft member so as to have a slightly larger size than the internal diameter of the one end part of the hollow portion of the bush,
an other end part of the shaft member is connected to a first shaft which is disposed on a transmission path of the power transmission device,
a second shaft which is disposed on a transmission path of the power transmission device is fitted to an other end part of the hollow portion of the bush, so that the bush is connected to the second shaft, and
wherein the surface of at least one of an inner periphery of the hollow portion of the bush and an outer periphery of the shaft member is subjected to a surface treatment in which slipping occurs when an excessive torque exceeding a predetermined value is applied, and the slipping stops and the original torque transmission to be performed in the power transmission device is performed again between the bush and the shaft member when the excessive torque is eliminated.

11. The joint unit used in the power transmission device according to claim 10, where each of the shaft member and the bush includes a coupling portion capable of being coupled to another power transmission shaft.

12. The power transmission device according to claim 1, wherein the surface treatment is a surface treatment which maintains transmission of the torque equivalent to the predetermined value between the first member and the second member when the excessive torque exceeding the predetermined value is applied and the slipping has occurred.

13. A power transmission device which transmits power between a first member and a second member, comprising:
a first shaft and a second shaft disposed on a power transmission path of the power transmission device,
wherein the first member has a hollow portion, the hollow portion penetrating the first member axially,
the external diameter of one end part of the second member is set slightly larger than the internal diameter of one end part of the hollow portion of the first member,
an other end part of the second member is connected to the first shaft,
the second shaft is fitted to an other end part of the first member so that the first member and the second shaft are connected to each other, and
the end part of the second member and the end part of the first member are fitted to each other within an elastically deformable range by interference fitting with the intensity such that slipping occurs when an excessive torque exceeding a predetermined value is applied,
wherein the power transmission device comprises a first reduction mechanism and a second reduction mechanism, and
wherein the first reduction mechanism comprises the first shaft, and the second reduction mechanism comprises the second shaft.

14. The power transmission device according to claim 13,
wherein the surface of at least one of an inner periphery of a hollow portion of the first member and an outer periphery of the second member is subjected to a surface treatment for performing fitting using interference fitting with the intensity.

15. A joint unit used in the power transmission device of claim 13, comprising a shaft member and a bush having a hollow portion, penetrating the bush axially,
wherein an external diameter of one end part of the shaft member is set to have a slightly larger size than an internal diameter of one end part of the hollow portion of the bush,
an other end part of the shaft member is connected to a first shaft which is disposed on a transmission path of the power transmission device,
a second shaft which is disposed on a transmission path of the power transmission device is fitted to an other end part of the hollow portion of the bush, so that the bush is connected to the second shaft, and
the one end part of the hollow portion of the bush and the one end part of the shaft member are fitted to each other within an elastically deformable range by interference fitting with the intensity such that slipping occurs when an excessive torque exceeding a predetermined value is applied.

16. The joint unit used in the power transmission device according to claim 15,
wherein the surface of at least one of an inner periphery of a hollow portion of the bush and an outer periphery of the shaft member is subjected to a surface treatment for performing fitting using interference fitting with the intensity.

* * * * *